Feb. 14, 1961 J. A. WALSH 2,971,355
COUPLING FOR ROTATABLE SHAFTS
Filed April 30, 1959

INVENTOR.
JOHN A. WALSH
BY Kenway, Jenney,
Witter & Hildreth
ATTORNEYS

2,971,355
COUPLING FOR ROTATABLE SHAFTS

John A. Walsh, Woburn, Mass., assignor to National Company, Inc., Malden, Mass., a corporation of Massachusetts Filed Apr. 30, 1959, Ser. No. 810,122

5 Claims. (Cl. 64—15)

My invention relates to a novel and improved coupling for rotatable shafts.

In the electronics industry, it is often necessary to connect a pair of coaxially aligned shafts, for example, to provide an extension of a potentiometer shaft so that it may be operated from a distant panel or to connect two switch shafts together. A coupling for such use should preferably be one which will provide accurate angular fixing of the shafts relative to each other and about their axes, resist any angular or axial motion between the shafts, and further resist any cocking of one shaft relative to the other.

Accordingly, it is the object of this invention to provide a novel and improved coupling for a pair of coaxially aligned rotatable shafts which will satisfy the requirements set forth above and which at the same time is simple and economical to fabricate and quickly and easily assembled.

The structural details of a shaft coupling embodying the present invention as well as the advantages thereof will be apparent from the following description taken together with the accompanying drawings in which.

Figure 1:
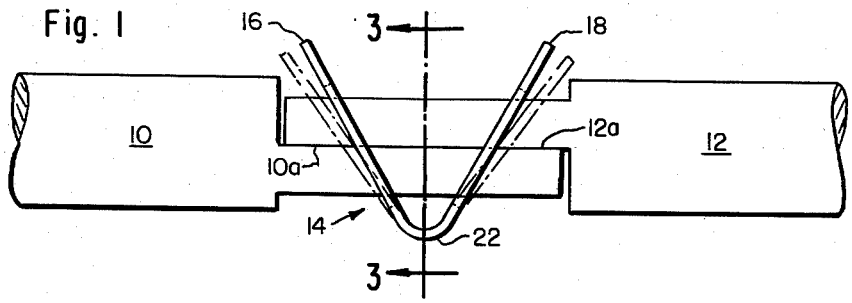
Fig. 1 is a side view of a pair of shafts connected by a shaft coupling made according to my invention.
Figure 3:
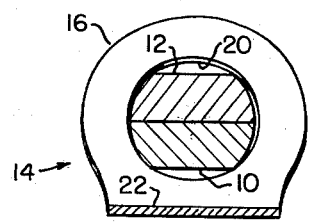
Fig. 3 is a sectional view substantially along the line 3—3 of Fig. 1.
Figure 4:
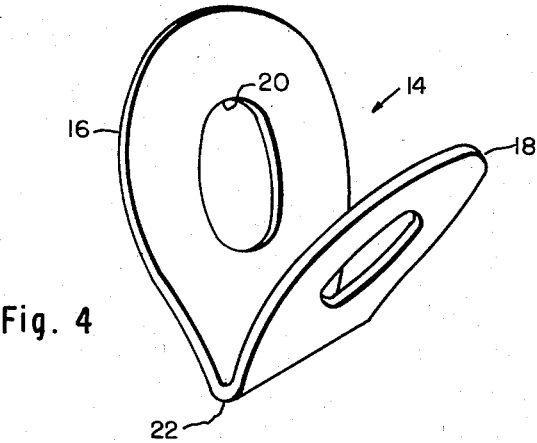
Fig. 4 is an enlarged perspective view of a clip forming a portion of the coupling of Fig. 1.

With reference to the drawing and particularly Figs. 1, 3 and 4, two shafts 10 and 12 are illustrated which it is desired to connect together for rotation. The coupling means of my invention comprises the provision of a pair of flat surfaces on the shafts which are engageable to provide a driving connection between the shafts and a spring clip or connector 14 resiliently gripping the shafts to hold the flattened portions of the shafts in firm engagement, thereby maintaining the rotative driving connection between the shafts and also resisting any relative movement between the shafts, either in the axial or transverse directions.

More specifically, the shafts 10 and 12 are of equal diameter and are each provided at one end thereof with flat driving surfaces 10a and 12a which extend diametrically across them. With the shafts axially aligned these flat surfaces are engageable in overlying relation, as shown in Fig. 1, so that with the shafts held in engagement, their longitudinal axes will be aligned and rotation of one shaft will result in rotation of the other.

To maintain the flat driving surfaces of the shafts in engagement, a resilient clip generally indicated at 14 is engaged about the shafts. The clip 14 is preferably fabricated of a resilient metal such as spring steel, and comprises a pair of symmetrical gripping portions 16 and 18 having aligned openings 20 formed therein which are generally circular in shape. The peripheral circular portions 16, 18 are joined together by an integral bight portion 22 with the gripping portions extending from the bight 22 at an angle to each other to provide a generally V-shaped configuration as best seen in Figs. 1 and 4.

The openings 20 in the clip 14 are configured and dimensioned to freely receive the overlying ends of the shafts 10, 12 when the legs of the clip are manually flexed toward each other from their free state position (this position being shown in broken lines in Fig. 1), to a position inwardly of the solid line position shown in Fig. 1. The ends of the shafts may then be inserted into the openings and their flattened diametrically extending driving surfaces engaged, whereupon the legs of the clip may be released so that they will spring out to the solid line position of Fig. 1. In this position the bordering edge portions of the openings 20 will engage the ends of the shafts. As most clearly shown in Figs. 1 and 3, when the clip legs are in their shaft gripping position, they are flexed inwardly and toward each other from their free state position so that the curved bordering edge portions of the openings 20 will resiliently grip the arcuate peripheral portions of the shaft ends to urge the flattened driving surfaces of the shaft ends into engagement and to resist any angular or axial relative movement of the shafts.

Figure 5:
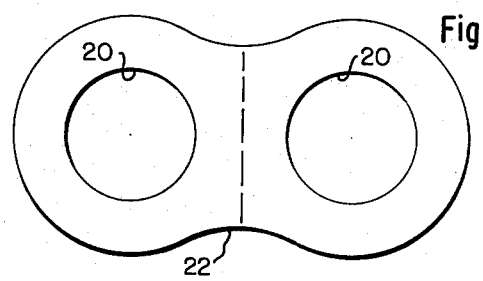
Fig. 5 is a plan view of a stamping from which a clip of the general type shown in Figs. 1, 3 and 4 may be made.

The clip 20 may be readily fabricated by stamping a generally figure-eight shaped piece from a sheet of metal, such as is shown at 22 in Fig. 5. The openings in the clip may, of course, be stamped at the same time. The stamping may then be folded along the dotted line of Fig. 5 to the V-shaped configuration of Figs. 1 and 4. The stamping 22 is provided with generally circular openings 20. The openings are made slightly larger in diameter than the diameter of the shafts to be coupled. For example if the shafts are the usual quarter-inch shafts common on potentiometers, switches and the like used in the electronics industry, I have found that the openings 20 should be of a minimum diameter to provide a 0.002" clearance over the maximum shaft diameter. I have found that this clearance will provide a sliding fit on the shaft, and will also provide the necessary gripping of the shafts to form a secure coupling as heretofore described.

Figure 2:
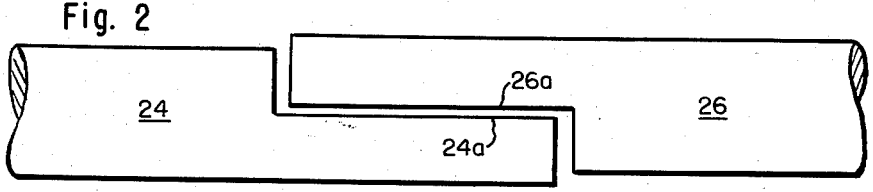
Fig. 2 is a side elevation of a pair of shafts similar to those of Fig. 1 but with different end cross sections.

The ends of the shafts 24, 26 shown in Fig. 2 are also provided with flat diametrically extending interengageable driving surfaces 24a and 26a. However, the ends of the shafts 24 and 26 are semi-circular in cross section rather than having a segmental portion removed therefrom as in the shafts of Fig. 1. With a clip such as shown in Fig. 1 having circular shaft openings and engaging shafts having ends such as shown in Fig. 2, edge portions of the shaft receiving openings 20 will firmly grip the curved peripheral portions of the shaft ends generally opposite the flat driving surfaces of the shafts.

With quarter inch shafts of the type described, I have found that circular openings as shown in Fig. 5 work well with shafts having the end configuration shown both in Figs. 1 and 2. Clips having circular openings are also relatively inexpensive to manufacture.

However, under some circumstances, the openings 20 may be made elliptical, diamond shaped, hexagonal or the like if desired. If the openings are made elliptical they are dimensioned to provide a minor axis extending parallel to the folded or bight portion of the clip and preferably only sufficiently larger than the diameter of the shaft with which the clip is to be used to permit easy insertion of the shaft ends of the openings as heretofore described. The major axis of the elliptical opening may then be selected such that at an included angle between the clip legs which is substantially less than the included angle between the legs when they are in an unflexed or unstressed condition, the bordering edge portions of the openings 20 will grip the arcuate peripheral surfaces of the shaft ends along an oblique line extending from adjacent the intersection of the flat driving surface and the curved peripheral surface of the shaft end.

Figure 6:
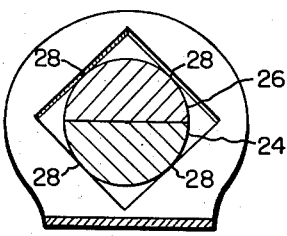
Fig. 6 is a section similar to that of Fig. 3 illustrating a clip having a polygonal rather than a circular opening formed therein.

A clip 14 having a diamond shaped opening is illustrated in Fig. 6. As shown therein, the diamond is formed with one of its axes parallel to the bight portion of the clip and the inner periphery of the opening bears on the composite shaft circumference at four points 28, holding the two shafts together in the manner heretofore described. It is important to note that the diamond opening is not required to be regular, but for example the lower portion might be dimensioned to accommodate a shaft segment of one diameter and the upper portion of shaft segment of another diameter. The only requirement is the shafts be provided with interengaging flattened surfaces on their ends. It is of course apparent that the opening in the clip might be triangular in shape, this configuration being particularly useful for shafts of different diameters.

I have found that a shaft coupling of the type described will firmly retain the shafts in the desired relative angular position and will resist any tending of one shaft to rotate about its axis relative to the other shaft. Additionally, any cocking or longitudinal movement of one shaft relative to another is resiliently resisted to assure the retention of the desired relative axial positions of the shafts as well as assuring accurate coaxial shaft alignment. Also, it should be particularly noted that there will be no axial or angular lost motion between the shafts, thus assuring that angular movement of one shaft will be accurately and immediately reflected by corresponding angular movement of the other shaft.

The specific embodiments shown and described herein have been given principally by way of example, it being particularly understood that the specific peripheral shape of the clip and of the opening therein may be varied as desired. Further, it is to be understood that the invention is to be limited only by the appended claims, which shall include within their scope all structure which logically falls within the language of the claims.

Having described my invention, what I claim as new and desire to secure by Letters Patent is:

1. A coupling for a pair of coaxially aligned rotatable shafts, an end of each shaft being provided with a driving surface extending diametrically thereacross, the driving surfaces of the shafts being engaged in overlying relation, and a clip resiliently holding said driving surfaces in engagement and comprising a pair of leg portions extending angularly of each other and resiliently connected at one end to permit flexing of the leg portions toward each other from a free unstressed position to a stressed shaft gripping position, each of the leg portions being provided with a shaft receiving aperture extending around both overlying shaft ends and each of the leg portions having a bordering edge portion resiliently gripping a peripheral portion of each shaft to urge the flat driving surfaces of the shafts into engagement and resist angular or axial movement between the shafts.

2. In a coupling for a pair of coaxially aligned shafts, an end of each shaft being provided with a flat driving surface extending longitudinally thereof and diametrically thereacross and arcuate peripheral portions extending coaxially of the shaft axis from the longitudinal edges of the driving surfaces, the driving surfaces of the shafts being engaged in overlying relation, and a generally V-shaped clip of resilient metal holding said driving surfaces in engagement and comprising a pair of leg portions resiliently connected at one end by an integral bight portion, the leg portions being provided with aligned shaft receiving apertures with the overlying ends of the shafts being received in each aperture, a bordering edge portion of each aperture being resiliently engaged with an arcuate peripheral portion of each shaft end to urge said driving surfaces into engagement and resist any angular or axial movement of the shafts relative to each other.

3. The combination defined in claim 2 in which said shaft receiving apertures in said clip are circular.

4. The combination defined in claim 2 in which said shaft receiving apertures in said clip are elliptical, said ellipse having a minor axis extending parallel to said bight portion.

5. The combination defined in claim 2 in which said shaft receiving apertures are diamond-shaped, whereby said bordering edge portions of said diamond-shaped, said aperture being formed in said clip such that one axis of said diamond is parallel to said bight.

References Cited in the file of this patent
UNITED STATES PATENTS 2,246,750    Murphy               June 24, 1941
2,894,774    Du Dash             July 14, 1959